United States Patent [19]
Butler et al.

[11] 3,740,070
[45] June 19, 1973

[54] VEHICLE SUSPENSION SYSTEM
[75] Inventors: James M. Butler, Peoria; Gerald P. Simmons, Washington, both of Ill.
[73] Assignee: Westinghouse Air Brake Company, Pittsburgh, Pa.
[22] Filed: July 19, 1971
[21] Appl. No.: 163,575

[52] U.S. Cl. ....... 280/104.5 R, 280/124 F, 180/30, 267/65 D
[51] Int. Cl. ............................................. B60p 1/60
[58] Field of Search .................... 280/80, 104.5 R, 280/124 F; 180/30; 267/65 R, 65 D

[56] References Cited
UNITED STATES PATENTS
3,201,141  8/1965  Bernstein et al. ............. 280/104.5 R
3,334,913  8/1967  Margala ....................... 280/104.5 R
3,001,799  9/1961  Plume .......................... 280/124 F Primary Examiner—Philip Goodman
Assistant Examiner—John A. Carroll
Attorney—Robert J. Eck

[57] ABSTRACT

A suspension system for supporting one side of a vehicle chassis having a pair of tandem axles, including hydraulic suspension cylinders connecting each axle with the chassis, a flow control valve and fluid lines connecting the flow control valve with the hydraulic suspension cylinders for equalizing pressure therebetween during the movement of the vehicle over relatively rough terrain; there being a fluid pressure accumulator connected with the flow control valve for absorbing the shock developed upon the vehicle traveling over a bump or a depression in the field.

5 Claims, 3 Drawing Figures

INVENTOR
JAMES M. BUTLER
GERALD P. SIMMONS

BY

ROBERT J. ECK
ATTORNEY

VEHICLE SUSPENSION SYSTEM

BACKGROUND AND SUMMARY OF THE INVENTION

The present invention relates in general to tandem axle vehicles and, more particularly, to a suspension system therefor.

Heretofore, prior art multi-ton capacity vehicles necessarily utilized relatively large diameter tires in order to safely support the dead and live load of the vehicle during usage. As a usual practice, said vehicles have employed a single rear axle, dual tire arrangement which was conducive to a substantially large heat build up in the tires leading to premature failure through blowouts, or the like, and to tire wear far below the desideratum, therefore requiring frequent replacement of the tires.

It is known that by adding more tires through dual tandem axles, the size of the tires can be reduced, as the number of tires would be increased, thereby reducing the problems of heat build up and increasing the life expectancy of the tires. However, when adding a second tandem rear axle, the problems are compounded in that the weight distribution between the tandem axles must be substantially equal at all times during operation. Since the vehicles are operated most frequently over a rough terrain, if the weight of the vehicle is not equally supported by the tandem axles, structural failure would result, or the vehicle would tip over in the field. Additionally, the presently known prior art suspension systems limit the load capacity of the vehicle because of the design limitations of the presently known suspension systems which comprise metal compression springs, air springs, rubber springs, and equalizing levers, or any combination thereof. The size and weight of the prior art suspension systems relative to the load carrying capacity of the vehicle limit the size of the vehicle which can be safely used in the field. Therefore, if a suspension system could be developed which is of lightweight construction and which would establish equal load distribution on dual tandem axles, larger capacity vehicles could be designed.

By the present invention, dual tandem axles are supported by a pair of hydraulic suspension cylinders which are connected in circuit through a fluid line for inner flow of fluid therebetween. A fluid pressure accumulator is also connected in circuit with the hydraulic suspension cylinders for absorbing any shocks which are created by the vehicle traveling over rough terrain. Moreover, the suspension system includes a pair of flow control valves which interconnect the accumulator and the suspension cylinders so that when one suspension cylinder is collapsed the shock is absorbed by the accumulator and the other suspension cylinder is extended a like amount to equalize the distribution of weight on the axles. Therefore, when the forwardmost tandem axle engages a depression or a bump, the rearwardmost axle will be elevated or lowered, respectively, through the hydraulic suspension cylinder a like amount with the pressurized fluid of the system being balanced at all times through the connecting fluid lines. Also, the suspension system of the present invention permits the addition of smaller size tires whereby the problem of heat build up therein is substantially eliminated, thereby enhancing the overall tire life and reducing the tire replacement costs.

DESCRIPTION OF THE PREFERRED EMBODIMENT

Figure 1:
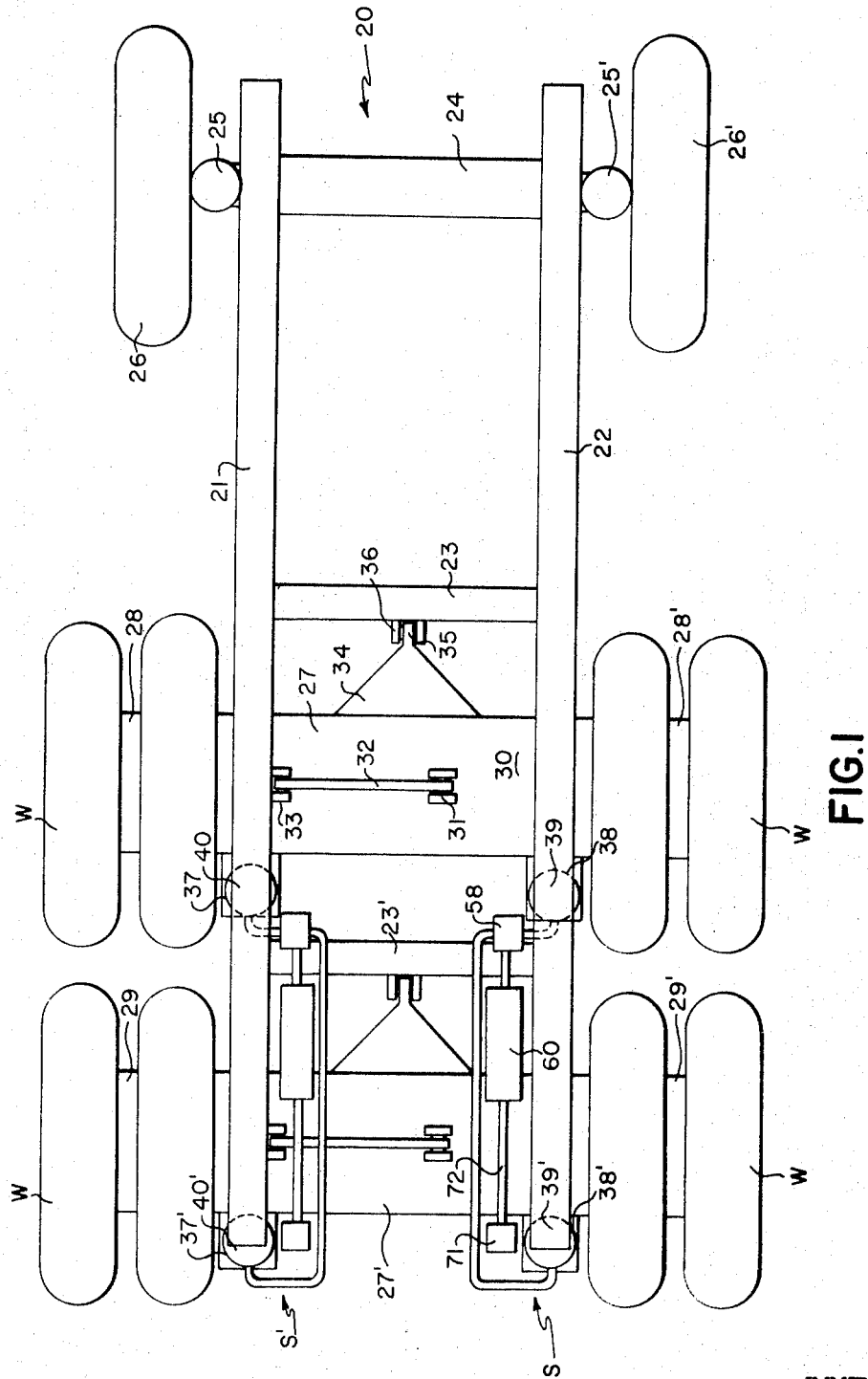
FIG. 1 is a top plan view of a vehicle chassis having tandem axles incorporating a suspension system constructed in accordance with and embodying the present invention.

Referring now to the drawings wherein like reference characters designate like corresponding parts, there is shown in FIG. 1 a vehicle chassis frame 20 comprising a pair of longitudinally spaced-apart rails 21,22 which are interconnected by transversely disposed cross beams 23,23'. Extending transversely of rails 21,22 in the forward portion of frame 20 is a front axle 24 having end portions 25,25' which project outwardly of frame 20 for rotatable mounting to front wheels 26, 26'. The rearward portion of frame 20 is provided with transversely disposed forward and rearward tandem axles 27,27', respectively, having end portions 28,28' and 29,29', each projecting outwardly of the related side rails 21,22 for accommodating dual wheels, collectively designated W.

Since both the forward and rearward tandem axles 27,27' comprise identical structure, only the forward tandem axle 27 will be described; it being understood that coreesponding elements of the rearward tandem axle 27' will be designated by like reference characters.

Said forward tandem axle 27 comprises a cylindrical casing 30 having mounted on its upper portion a bearing 31 within which is received for pivotal movement one end portion of a stabilizer bar 32, the other end portion of which is journaled within a bearing 33 suitably mounted on the rail 21 fo chassis frame 20. Formed integral with the forward portion of said forward tandem axle 27 is a wedge-shaped connector 34 having walls diverging into a tongue 35 which is pivotally connected to a spherical bearing 36 fixed centrally of said cross beam 23. Fixed to the rearward portion of forward tandem axle 27 are a pair of spaced-apart supports 37,38 which project rearwardly of casing 30 underlyingly of rails 21, 22, respectively. Each support 37,38 is of flat plate construction, preferably having a gusset plate g (FIG. 2) connecting the side edges of each support 37,38 with the casing 30 for augmenting the strength thereof.

Interposed between the rail 21 and support 37 and between rail 22 and support 38 is an identical hydraulic suspension cylinder 39,40, respectively, of conventional design being of the type manufactured and sold by Westinghouse Air Brake Company of Peoria, Ill. known as HYDRAIR II. (HYDRAIR is a trademark of Westinghouse Air Brake Company, Peoria, Ill., registered on the Principal Register of the United States Patent Office.) Thus, it can be seen that the forward tandem axle 27 is rockably mounted to the chassis frame 20 by a three point connection; in its rearward portion by the hydraulic suspension cylinders 39: 40 and in its forward portion by said wedge-shaped connector 34, so as to permit rockable movement of said forward tandem axle 27 relative to chassis frame 20. The stabilizer bar 32 prevents the forward tandem axle 27 from transverse axial movement relative to the frame 20 but allows vertical and rockable movement about the transverse axis.

Figure 2:
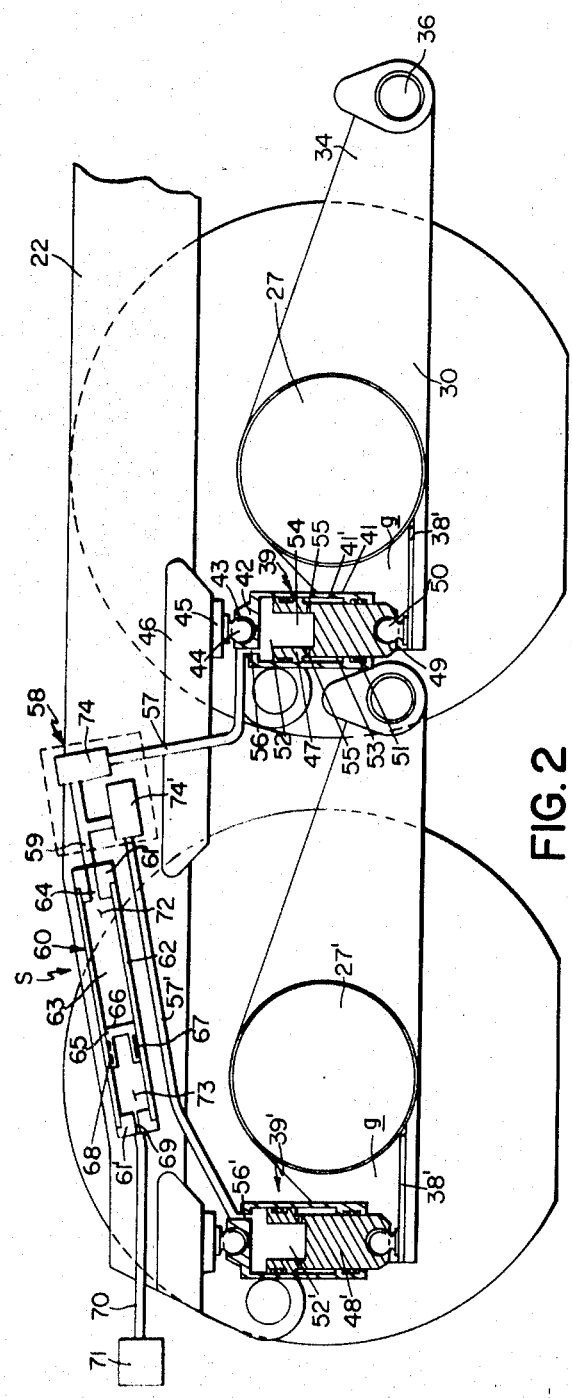
FIG. 2 is an elevational view in partial section of the vehicle suspension system illustrated in FIG. 1.
Figure 3:
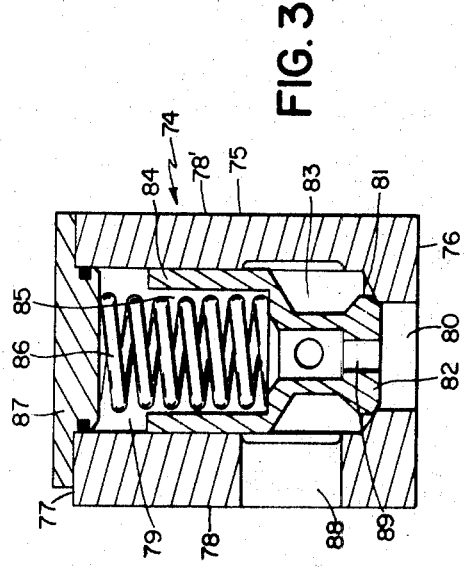
FIG. 3 is an enlarged view of a transverse section taken through a flow control directional valve of the suspension system.

Since the hydraulic suspension cylinders 39 and 40 are identical in construction, only hydraulic cylinder 39 will be described. Referring to FIG. 2, hydraulic suspension cylinder 39 comprises a downwardly opening casing 41 having a bore 41' and an end wall 42 formed with a socket 43 and receiving a ball 44 which is fixed by a bracket 45 to a support arm 46 attached to rail 22. Received within the bore 41' of casing 41 is a piston head 47 and a piston rod 48, which latter extends outwardly endwise of casing 41. Formed within the outer end portion of piston 48 is a socket 49 for receiving a ball 50 which is mounted on support 38. Surroundingly of piston rod 48 is provided a conventional gland assembly 51 for reception into the bore 41' of casing 41 for sealing purposes. Piston head 47 divides bore 41' into an upper compartment 52 and a lower compartment 53, there being an axial recess 54 within piston head 47 which extends spacedly downwardly and is in communication with the low compartment 53 through ports 55,55'. Therefore, the fluid within the hydraulic suspension cylinder 39 is transferable from the upper compartment 52 to the lower compartment 53 upon slideable, reciprocal action of the piston rod 48 responsive to the rockable action of the forward tandem axle 27.

It will be observed that the rearward portion of both forward and rearward tandem axles 27,27' are supported by the hydraulic suspension cylinders 39,39' relative to rail 22, and 40,40' relative to rail 21; said hydraulic suspension cylinder 39,39' forming part of a vehicle suspension system S located on one side of chassis frame 20 and hydraulic suspension cylinders 40,40' forming part of an identical suspension system S' located on the other side of chassis frame 20. Since both vehicle suspension systems S and S' are identical in construction, only vehicle suspension system S will be described.

Formed within end wall 42 of casing 41 is a port 56 which is connected by a conduit 57 to a flow control valve assembly, generally designated 58; the latter also being connected by conducit 57' to the port 56' of hydraulic suspension cylinder 39'.

Connected to flow control valve assembly 58 by a conduit 59 is a fluid pressure accumulator 60 comprising a pair of end walls 61,61' and an intervening side wall 62, which walls cooperate to define an inner compartment 63; there being a port 64 provided in end wall 61 to which conduit 59 is connected. Disposed within compartment 63 for slideable reciprocal movement therein, there is a piston 65 having a transverse wall 66 and a peripheral skirt 67, the latter being in sealing engagement with the inner face of side wall 62 as by seals 68, such as, T-rings or cup seals, as is well known in the art. Said end wall 61' is provided with a port 69 which is connected by line 70 to a source of pressurized gas 71, such as nitrogen. Thus, it will be observed that the compartment 63 is divided by piston 65 into a hydraulic fluid chamber 72 and a pressurized gas chamber 73 for purposes to be presently described.

The flow control valve assembly 58 incorporates a pair of identical valves 74,74'; valve 74 being connected by a conduit 57 to the port 56 of hydraulic suspension cylinder 39, and valve 74' by conduit 57' to the port 56' of hydraulic suspension cylinder 39'. Since both valves 74,74' are identical in construction, only valve 74 will be described.

Valve 74 comprises a body 75 having a front wall 76, rear wall 77, and a pair of side walls 78,78'; there being a bore 79 formed axially within rear wall 77 which bore 79 terminates spacedly from front wall 76. Provided axially within front wall 76 is an aperture 80 which is connected to conduit 57, said aperture 80 being of less cross sectional extent than bore 79 for developing a seat 81 against which abuts the head portion 82 of a valve member 83 housed within said bore 79. Said valve member 83 is provided with a stem portion 84 having an endwise opening recess 85 for accommodating oen end portion of a compression spring 86, the other end portion bearing against a backing plate 87 removably mounted to rear end wall 77. The compression spring 86 normally urges the head portion 82 of valve member 83 into sealing engagement with the aperture 80. Provided in side wall 78 is a port 88 which is connected by conduit 59 to the accumulator 60. Thus, it will be observed that valve member 83 normally resists flow of fluid into port 88 but permits flow of fluid through aperture 80 in which case the head portion 82 is unseated for permitting flow of fluid therethrough.

The head portion 82 of valve member 83 is formed with a fluid bypass 89 which communicates with port 88 and aperture 80 for permitting flow of fluid to the hydraulic suspension cylinder 39 when the head portion 82 is in seated engagement with seat 81. It will be noted that the cross sectional dimension of fluid bypass 89 is relatively less than the fluid passage between port 88 and aperture 80. The fluid bypass 89 thus allows a controlled amount of hydraulic fluid to flow through said valve 74 in a direction toward the hydraulic suspension cylinder 39, while allowing free flow of hydraulic f'uid through aperture 80 and port 88 from said hydraulic suspension cylinder 39. The fluid bypass 89 and valve member 83 may be readily changed for altering the flow of fluid by removing the valve member 83 and replacing same with another valve member having a larger or smaller fluid bypass, depending on the desired result.

OPERATION

Since the vehicle suspension system S and S' are identical in structure and in operation, only the vehicle suspension system S will be described; it being understood that the vehicle suspension system S' operates in the identical manner.

In operation, the accumulator 60 is charged with pressurized nitrogen gas from the source of gas 71 to a predetermined pressure so that piston 65 is positioned within compartemnt 63 with the areas of the pressurized gas chamber 73 and hydraulic fluid chamber 72 being substantially the same. Additionally, hydraulic fluid is filled to a predetermined amount within hydraulic fluid chamber 72, each upper compartment 52,52' of the hydraulic suspension cylinders 39,39', the conduits 57,57' and the valve 74,74'. Therefore, thre is a predetermined gas pressure within accumulator 60 and a predetermined hydraulic fluid volume within the suspension system S. The gas pressure acting on piston 65 in the accumulator 60 develops equal pressure on the hydraulic fluid within hydraulic fluid chamber 72 assuming that the vehicle is presented on a perfectly level plane and all the hydraulic suspension cylinders are extended an equal amount.

As the vehicle travels across the round, and a bump is engaged by the wheels W of the front tandem axle 27, the same will be urged upwardly for urging the piston 48 upwardly within casing bore 41'. FLuid within the upper compartment 52 will be forced through port 56 and conduit 57 for unseating the head portion 82 of valve member 83 thereby permitting flow of fluid through aperture 80 and port 88, conduit 59 and port 64 into the hydraulic fluid chamber 72 of accumulator 60. The additional fluid within fluid chamber 72 will impinge against piston 65 for moving same axially therein compressing the gas within gas chamber 73 to absorb the shock of the bump. Simultaneously, the fluid passing through port 88 will be directed through valve 74' at a controlled amount through the bypass 89' as above described, through conduit 57' and into the upper compartment 52' of the hydraulic suspension cylinder 39' of rearward tandem axle 27' for lowering the piston 48' a substantially identical distance in the opposite direction as the movement of piston 48. Thus, in addition to the shock of the bump being absorbed by accumulator 60 the load of the vehicle on the forward and rearward tandem axles 27,27' is equally distributed through the balance of fluid pressure between the hydraulic suspension cylinders 39,39' of the vehicle suspension system S.

Similarly, when the forward tandem axle 27 enters into a dip the piston 48 will be extended as the forward tandem axle 27 is lowered. When this occurs the weight on the rear tandem axle 27' will be increased for urging the piston 48' upwardly to force fluid within the upper compartment 52' through port 56' and conduit 57' for unseating the valve member 83' for flow of fluid througy conduit 59 to the accumulator 60 and through valve 74, conduit 57, port 56, into upper compartment 52 of hydraulic suspension cylinder 39 Thus, it will be readily observed that the vehicle suspension system S utilizes the hydraulic suspension cylinders 39,39' and the associated connecting means to effect a substantially simultaneous elevation and lowering of the respective forward and rearward tandem axles 27,27' for developing a smooth, even ride over any kind of rough terrain with the weight of the vehicle being equally distributed at all times.

Additionally, in situations where the wheels W of both forward and rearward tandem axles 27,27' would be either elevated or depressed simultaneously, such as in a situation where both fall into a sharp dip in the terrain, both pistons 48,48' are upwardly extended for urging fluid through conduits 57,57' through flow control valve assembly 58 into the accumulator 60 so that the latter absorbs the shock developed.

In the event that the vehicle is turned sharply to the right or left of the path of travel, the chassis frame 20 will be lowered on one side and raised on the other because of the centrifugal force created by the turn. In this situation, the suspension systme S and S' on the opposed sides of the chassis frame 20 cooperate wherein on the side of the turn, the pistons 48,48' are elevated for forcing fluid through conduits 57,57', flow control valve assembly 58 and conduit 59 into the accumulator 60 for absorbing the shock of the lowering of the frame 20; and the other side of the chassis frame 20 cooperates to lower both pistons 48,48' for maintaining the wheels W of both forward and rearward tandem axles 27,27' in contact with the ground. Thus, by the vehicle suspension systems S,S' the potentially dangerous sisutation of having a vehicle tip over is eliminated.

Therefore, it can be seen by the vehicle suspension system S of the present invention, the weight of the vehicle is equally distributed over the forward and rearward tandem axles 27,27' at all times.

Having described our invention, what we claim and desire to obtain by Letters Patent is:

1. A suspension systm for supporting one side of a vehicle chassis having a pair of tandem axles comprising:
   First fluid responsive support means connecting the chassis and one of said tandem axles;
   Second fluid responsive support means connecting the chassis and the other of said tandem axles;
   Flow control means;
   First conduit means connecting said first fluid responsive support means to said flow control means;
   Second conduit means connecting said second fluid responsive support means to said flow control means;
   Fluid pressure absorbing means;
   Third conduit means connectinf said fluid pressure absorbing means and said flow control means;
   Valve means within said flow control means for directing fluid flow from one fluid support means in predetermined unequal proportion between said fluid pressure absorbing means and the other of said fluid pressure support means so that the greater volume of fluid is directed to the fluid pressure absorbing means while a controlled volume of fluid is metered to the other of said fluid pressure support means.

2. A suspension system as defined in claim 1 and further characterized by:
   Said valve means comprising at least one valve body;
   Said valve body having an inlet aperture connected to said first conduit means, and an outlet port connected in parallel to said second and third conduit means, therebeing passage means within said valve body establishing communication between said inlet aperture and said outlet port;
   A valve member within said passage means;
   Resilient means for normally urging said valve member into seated engagement with said inlet aperture for closing same;
   Said valve member having a bypass for establishing communication between said outlet port and said inlet aperture when said valve member is in seated engagement, said bypass being of a predetermined cross-sectional extent for effecting a controlled fluid flow therethrough.

3. A suspension system as defined in claim 1 and further characterized by:
   Said valve means comprising a first valve body having an inlet port connected to said first conduit means, and a second valve body having an inlet port connected to said second conduit means;
   Each first and second valve bodies having an outlet port, there being passage means within each valve body for communicating the respective inlet and outlet ports;
   Said third conduit means interconnecting the outlet ports with each other and with the fluid pressure absorbing means;
   A valve member in the passage means of each valve body;

Resilient means for normally urging each valve member into seated engagement with the related inlet port for closing same;

Each valve member having a bypass for establishing communication between the related inlet and outlet ports when the respective valve member is in seated engagement, said bypass being of a predetermined cross-sectional extent for effecting a controlled fluid flow therethrough.

4. The invention as defined in claim 1 and further characterized by:

Each of said first and second fluid responsive support means comprising a cylinder;

A reciprocal piston received within said cylinder and dividing same into upper and lower compartments;

Passage means within said piston for communicating said upper and lower compartments;

Each of said upper compartments having a port;

Saif first and second conduit means connecting the port of the related fluid responsive support member to said flow control means.

5. A suspension system for supporting one side of a vehicle chassis having a pair of tandem axles comprising:

First fluid responsive support means connectng the chassis to one of said tandem axles;

Second fluid responsive support means connecting the chassis to the other side of said tandem axles;

First conduit means connecting said first and second fluid responsive support means for establishing fluid flow therebetween;

Fluid pressure absorbing means;

Flow control means within said first conduit means for selectively regulating the flow of fluid between said first and second fluid responsive support means;

Second conduit means connecting said flow control means and said fluid pressure absorbing means;

Said flow control means comprising at least one valve body;

First fluid passage means within said valve body for establishing communication with said fluid responsive support means and said fluid pressure absorbing means;

A valve member within said valve body;

Resilient means normally urging said valve member into closed relationship with said first passage means for restricting flow toward said fluid responsive support means;

Second fluid passage means within said valve member for establishing communication with said fluid responsive support means and said fluid pressure absorbing means, said second fluid passage means being of a predetermined extent for effecting controlled fluid flow toward said fluid responsive support means when said valve member is in closed relationship with said first fluid passage means;

Each of said first and second fluid responsive support means comprising a cylinder;

A reciprocal piston received within said cylinder and dividing same into an upper compartment and a lower compartment;

Passage means within said piston for communicating said upper and lower compartments;

Each of said upper compartments having a port;

Said conduit means connecting the port of each fluid responsive support members to the passage means of said flow control body.

* * * * *

UNITED STATES PATENT OFFICE
CERTIFICATE OF CORRECTION

Patent No. 3,740,070  Dated June 19, 1973

Inventor(s) James M. Butler et al

It is certified that error appears in the above-identified patent and that said Letters Patent are hereby corrected as shown below:

Column 2, line 33, erase "coreesponding" and insert --- corresponding ---;

line 40, erase "fo" and insert --- of ---;

Column 3, line 45, erase "conducit" and insert --- conduit ---.

Column 4, line 15, erase "oen" and insert --- one ---;

line 38, erase "f'uid" and insert --- fluid ---;

line 55, erase "compartemnt" and insert --- compartment ---;

Column 5, line 36, erase "througy" and insert --- through ---;

line 59, erase "systme" and insert --- systems ---.

Column 6, line 2, erase "sisu-" and insert --- situ- ---;

line 10, erase "systm" and insert --- system ---;

line 23, erase "connectinf" and insert --- connecting ---.

Signed and sealed this 8th day of January 1974.

(SEAL)
Attest:

EDWARD M. FLETCHER, JR.
Attesting Officer

RENE D. TEGTMEYER
Acting Commissioner of Patents